United States Patent [19]

Friedrich

[11] Patent Number: 4,934,481
[45] Date of Patent: Jun. 19, 1990

[54] ARRANGEMENT FOR SUPPRESSING JET ENGINE NOISE

[76] Inventor: Thomas E. Friedrich, 7 Egerton Place, London, S.W.3, United Kingdom

[21] Appl. No.: 221,559

[22] Filed: Jul. 20, 1988

[30] Foreign Application Priority Data

Jul. 24, 1987 [GB] United Kingdom ............... 8717584

[51] Int. Cl.$^5$ ........................... F02K 1/00; F01N 1/14
[52] U.S. Cl. .................................... 181/215; 181/220
[58] Field of Search ............ 181/213, 214, 215, -218, 181/219, 220, 224

[56] References Cited

U.S. PATENT DOCUMENTS

| 2,886,946 | 5/1959 | Parker | 181/215 X |
| 3,780,827 | 12/1973 | Straight | 181/216 |
| 4,175,640 | 11/1979 | Birch et al. | 181/213 |

FOREIGN PATENT DOCUMENTS

| 0119732 | 9/1984 | European Pat. Off. |
| WO88/03281 | 9/1983 | PCT Int'l Appl. |
| 532414 | 1/1941 | United Kingdom |
| 767513 | 2/1957 | United Kingdom |
| 861819 | 3/1961 | United Kingdom |
| 878191 | 9/1961 | United Kingdom |
| 1183893 | 3/1970 | United Kingdom |
| 1197104 | 7/1970 | United Kingdom |
| 1207194 | 9/1970 | United Kingdom |
| 1339772 | 12/1973 | United Kingdom |
| 1521495 | 8/1978 | United Kingdom |

Primary Examiner—Benjamin R. Fuller
Attorney, Agent, or Firm—Kerkam, Stowell, Kondracki & Clarke

[57] ABSTRACT

According to the present invention, there is provided a jet engine comprising a cowl, an exhaust nozzle at the rear of the engine, a plurality of vanes that extend substantially circumferentially around the cowl of the engine in the region of the exhaust nozzle, means to support the vanes on the cowl so that the vanes can be moved between a retracted position in which they lie close to the cowl and an extended position in which they are spaced apart from the cowl so that, together with the cowl, the extended vanes define a substantially annular duct having an inlet and an outlet, one or more nozzles beneath each vane for directing high pressue air into the duct in a direction towards the rear of the engine, means for feeding high pressure air from the engine to the nozzles and an actuator arrangement for moving the vanes between the extended and retracted positions. When the vanes are in their extended position, the air leaving the duct outlet creates a zone of accelerated and turbulent air surrounding the exhaust gases from the engine and this reduces the noise caused by the engine exhaust. The nozzles in the duct form an ejector (or jet) pump drawing further air in through the duct inlet.

16 Claims, 3 Drawing Sheets

ARRANGEMENT FOR SUPPRESSING JET ENGINE NOISE

FIELD OF THE INVENTION

This invention relates to an arrangement that can be fitted to aircraft engines for the suppression of the exhaust noise from such engines; simultaneously, the arrangement of the present invention augments thrust produced by the engine when the aircraft is travelling at low speed. The present invention also provides an engine when fitted with the arrangement.

Jet engine noise on takeoff and landing has prompted legislation internationally that proposes to make the operation of more than fifteen thousand transport engines which are currently in use illegal in the 1990's. And it has halted development of new technology low bypass ratio engines needed to power new transports above wind and weather and air traffic congestion at transonic speeds.

The greater part of objectionable noise emanating from jet engines is caused by their high velocity exhaust rubbing on the ambient air immediately surrounding the exhaust plume (the noise is generated similar to a chirping cricket rubbing its wings on its body). New high bypass ratio turbo fan engines reduce this noise by ejecting a larger diameter column of air at lower speed (as compared to low bypass engines). However, high bypass engines are not optimized for long range cruising at high altitude and high speed.

DESCRIPTION OF PRIOR ART

Most older technology engines with near 1:1 bypass ratios, which are optimized for flying at high altitude and high speed, have recently been modified with cowling soundproofing and fixed exhaust noise suppressors that diffuse the high velocity exhaust to reduce the rubbing action. This arrangement has brought the perceived noise level on take off and landing down to approximately 100 decibels, which is in compliance with present legislation represented by U.S. Federal Aviation Regulation Part 36, stage two and ICAO Annex 16. However, a reduction to approximately 96 decibels will be required if proposed legislation is enacted and it is also a reasonable level to strive for in order to enhance airport-community relations.

Noise suppression technology exists for these older engines as well as planned new low bypass ratio engines but those available to date degrade the performance throughout the entire flight spectrum. For example, it is known to reduce engine noise by placing circumferential vanes around the rear of the cowling to provide an annular gap between the vanes and the cowling which generates a blanket of turbulent air around the high velocity exhaust plume of the engine thereby reducing the rubbing action of the exhaust against ambient air. However, the vanes increase drag and are particularly disadvantageous when flying at cruising speeds where noise suppression is not required.

A noise-suppression arrangement is described in GB-861,819, and provides a plug body located coaxially with the engine axis in the exhaust plume. The plug has segments that can be extended radially outwardly to divide the engine exhaust into a plurality of distinct jets, thereby reducing noise but also reducing thrust appreciably.

GB 878,191 describes an engine whose cowling has a rear section that can be moved rearwardly to open up an annular slot between the fixed section of cowling and the rear section of cowling, thereby entraining air to form a blanket of turbulent air surrounding the exhaust plume which reduces the 'rubbing' with ambient air and also reducing noise. Unfortunately, such an arrangement also increases drag appreciably.

GB 1,197,104 and 1,339,772 both describe an arrangement to reduce jet engine noise in an engine having a nozzle ejecting a high velocity exhaust jet and a fairing surrounding the nozzle providing an annular flow of secondary air around the exhaust jet. Noise reduction is achieved by extending a series of retractable baffles into the exhaust of the engine which scoop the high-velocity exhaust and causes it to mix with the secondary air flow, thereby increasing the mixing between the exhaust jet and the secondary air and so increasing the superficial area of the exhaust and thus reducing the noise of the engine. Unfortunately, this arrangement also reduces thrust.

BRIEF DESCRIPTION OF THE INVENTION

According to the present invention, there is provided a jet engine comprising a cowl, an exhaust nozzle at the rear of the engine, a plurality of vanes that extend substantially circumferentially around the cowl of the engine in the region of the exhaust nozzle, means to support the vanes on the cowl so that the vanes can be moved between a retracted position in which they lie close to the cowl and an extended position in which they are spaced apart from the cowl so that, together with the cowl, the extended vanes define a substantially annular duct, one or more nozzles beneath each vane for directing air from the engine into the duct in a direction towards the rear of the engine, means for feeding high pressure air from the engine to the nozzles situated beneath the vanes and an actuator arrangement for moving the vanes between the extended and retracted positions.

The noise suppressing arrangement of the present invention can be incorporated into new engines or retro-fitted to existing engines. Thus, according to a second aspect of the present invention, there is provided an arrangement for reducing the exhaust noise from a jet engine that has a cowl, an exhaust nozzle at the rear of the engine and a source of high pressure air, wherein the arrangement comprises:

means for attaching the arrangement to the engine cowl in the region of the exhaust nozzle, a plurality of vanes that can extend substantially circumferentially around the cowl of the engine in the region of the exhaust nozzle, means to support the vanes on the attaching means so that the vanes can be moved between a retracted position in which they will lie close to the cowl and an extended position in which they will be spaced apart from the cowl so that, together with the cowl, the extended vanes will define a substantially annular duct, actuating means for moving the vanes between the extended and retracted positions, a plurality of nozzles that can be arranged beneath the vanes, and a manifold for feeding air from the high pressure air source of the engine to the nozzles.

The duct will usually not extend continuously around the engine cowl but will be segmented, each segment of the duct being formed by the volume under each extended vane.

When the vanes are extended to form the annular duct, air is caused to flow through the duct by two factors:

(1) the ejection of air through the nozzles acts as an ejector (or jet) pump and entrains air in the duct urging it out through the the duct outlet and so creating an area of reduced pressure at the duct inlet which causes ambient air to be drawn into the duct inlet where it is also entrained by the air ejected from the nozzles and so urged through the duct outlet, and (2) the motion of the aircraft through the air.

Preferably, a restriction to air flow is located in the duct between the duct inlet and the duct outlet and the nozzles are located in the vicinity of the restriction, which enhances the action of the ejector pump. The restriction may be formed by suitably shaping the inside surface of the vanes and/or the surface of the engine cowl underlying the vanes.

The duct outlet is preferably shaped to direct the air leaving the duct (secondary air) into the jet ejected from the exhaust nozzle of the engine at an angle to cause it to mix with the exhaust jet so as to diffuse the exhaust jet thereby reducing the noise of the engine. The secondary air also causes a blanket of accelerated turbulent air around the exhaust thereby reducing the aforementioned rubbing action. In addition, the secondary air from the duct actually increases the thrust from the engine especially at low aircraft speeds as will be described below.

The air fed to the nozzles in the duct may be bled from a high-pressure region within the engine; I prefer to take it from the air supply that is customarily provided for anti-icing purposes. The bleeding off of such high pressure air will slightly reduce the thrust of the jet exhaust by reducing the velocity of the air ejected through the engine exhaust nozzle but the reduction in thrust will be small since, at take-off and landing, the engine has excess high pressure air anyway which is variously bled off for high pressure compressor air flow control; the flow control devices can even be adjusted to optimise the production of air for the ejector nozzles. The reduction in the velocity of the jet exhaust air contributes to reducing the noise of the engine. The bleed off of high pressure compressor air from the engine does not reduce the thrust produced by the engine as a whole, however, because of the additional thrust derived from the secondary air flow was a result of air ejected from the outlet of the duct by the pumping action described above and this additional thrust can be greater than the loss of thrust in the exhaust jet; I estimate that this action may increase the thrust by up to 5%. Thus, in contrast to known noise suppresion arrangements, the present invention can increase thrust as well as suppressing noise.

The vanes can be deployed (i.e. extended) during take off and landing thereby suppressing noise during these periods but the vanes can be retracted in flight so that high speed flight performance of the engine is not impaired.

Preferably each vane is supported by means of a plurality of pivoted supporting arms. Each vane preferably has, on each end, one or more forward arms that are located in front of one or more rearward arms. The arms are preferably capable of rotating forwardly about pin hinges that attach them to the cowl structure to move the vane to its retracted position, and rearwardly about the pin hinges to move the vane to its extended position. A plurality of springs may be provided to bias the vanes to their extended position. The springs may be provided as spring hinges or pivots for the vane supporting arms.

Any appropriate mechanism may be employed to move the vanes between their retracted and extended position. Preferably, however, this is achieved by means of one or more cables that are connected to the vanes and can pull the vanes toward their retracted position. The cables themselves are advantageously actuated by means of one or more hydraulic servos which may be mounted in the utilities section of the engine. Once in their retracted position, the vanes may be locked until it is required to move them to their extended position for take off or landing. This may be achieved by means of a remotely releasable locking mechanism, for example, a solenoid release sear on the lower radius of each forward vane supporting arm.

BRIEF DESCRIPTION OF THE DRAWINGS

One embodiment of the present invention will now be described by way of example with reference to the accompanying drawings in which.

DESCRIPTION OF PREFERRED EMBODIMENTS

Figure 1:
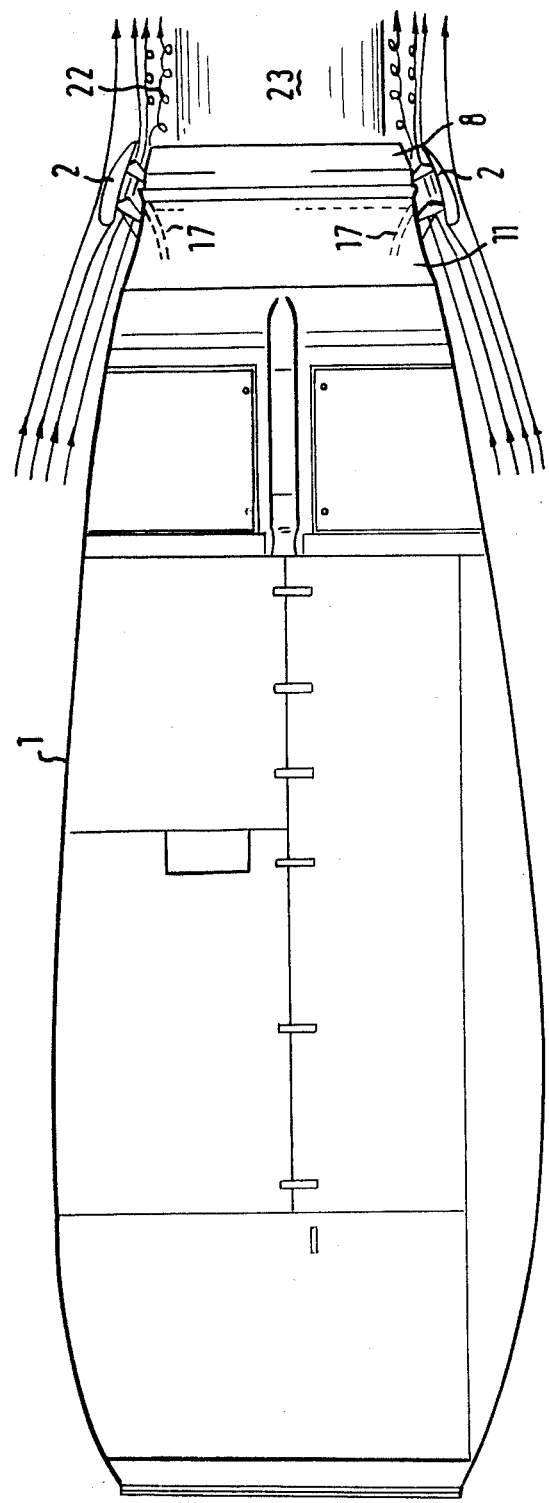
FIG. 1 is a partly cut-away side elevation of a low bypass turbo jet engine according to the invention.

Referring to the accompanying drawings, there is depicted an arrangement for reducing the noise from an engine 1 having a cowl 11 and an exhaust nozzle 8 from which a high velocity exhaust jet 23 is ejected. The noise-reducing arrangement includes four aerofoil vanes 2 of lightweight heat-resistant composite material which are attached to the engine cowl 11 by means of pivoted arms 3a and 3b. The arms 3a and 3b are attached to the forward and trailing edges (respectively) of the vanes 2 by means of pin hinges and the other ends of arms 3a and 3b are attached to the cowl 11 by spring biassed pin hinges 12 (see FIG. 2). The arms can be aerodynamically shaped and can act to guide the air through an annular duct 14 between the vanes and the cowl. As can be seen from FIG. 3, the four vanes 2 extend circumferentially around the cowl just forward of the engine exhaust nozzle 8 and the arms 3a and 3b are located at the end of each vane. It will be appreciated that the number of vanes need not be four.

Figure 2:
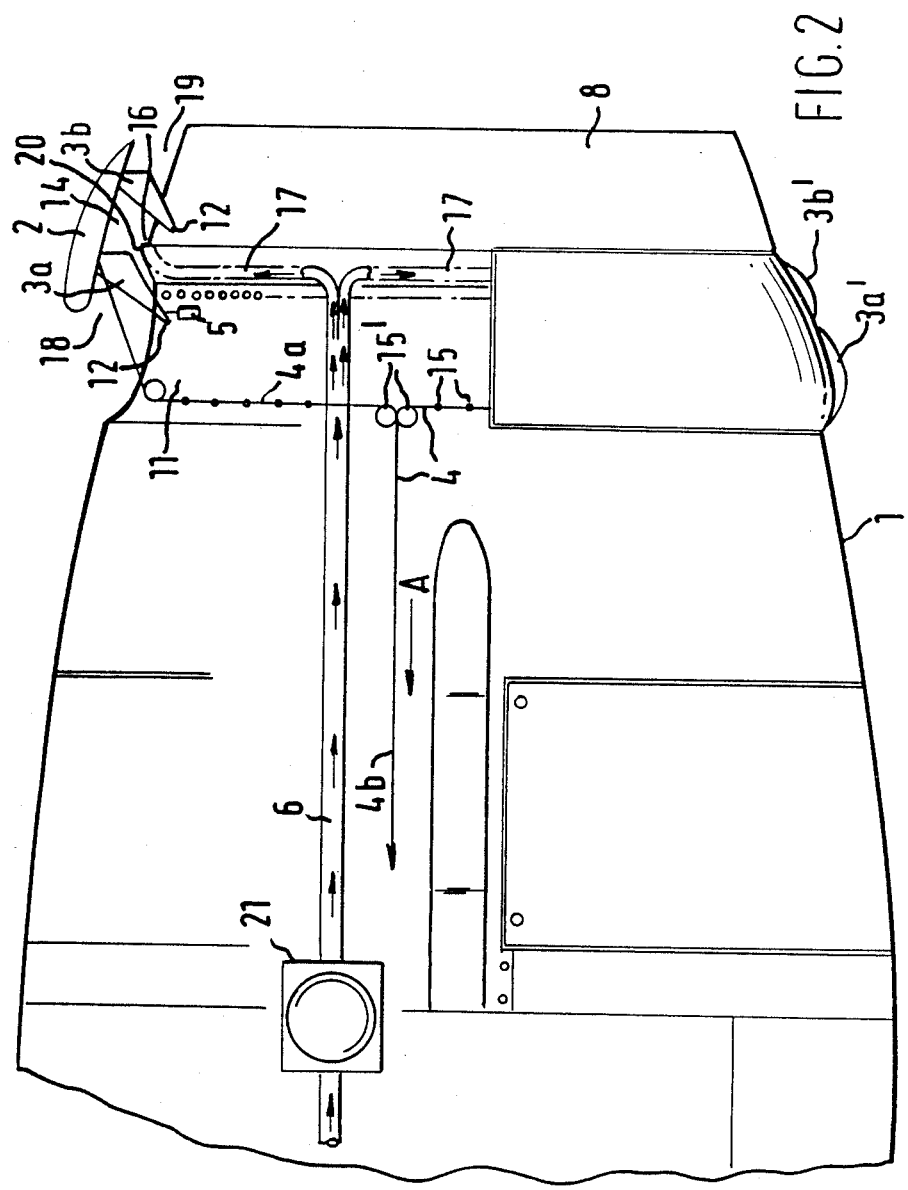
FIG. 2 is a partly cut-away elevation showing the noise reduction arrangement of FIG. 1 in greater detail.
Figure 3:
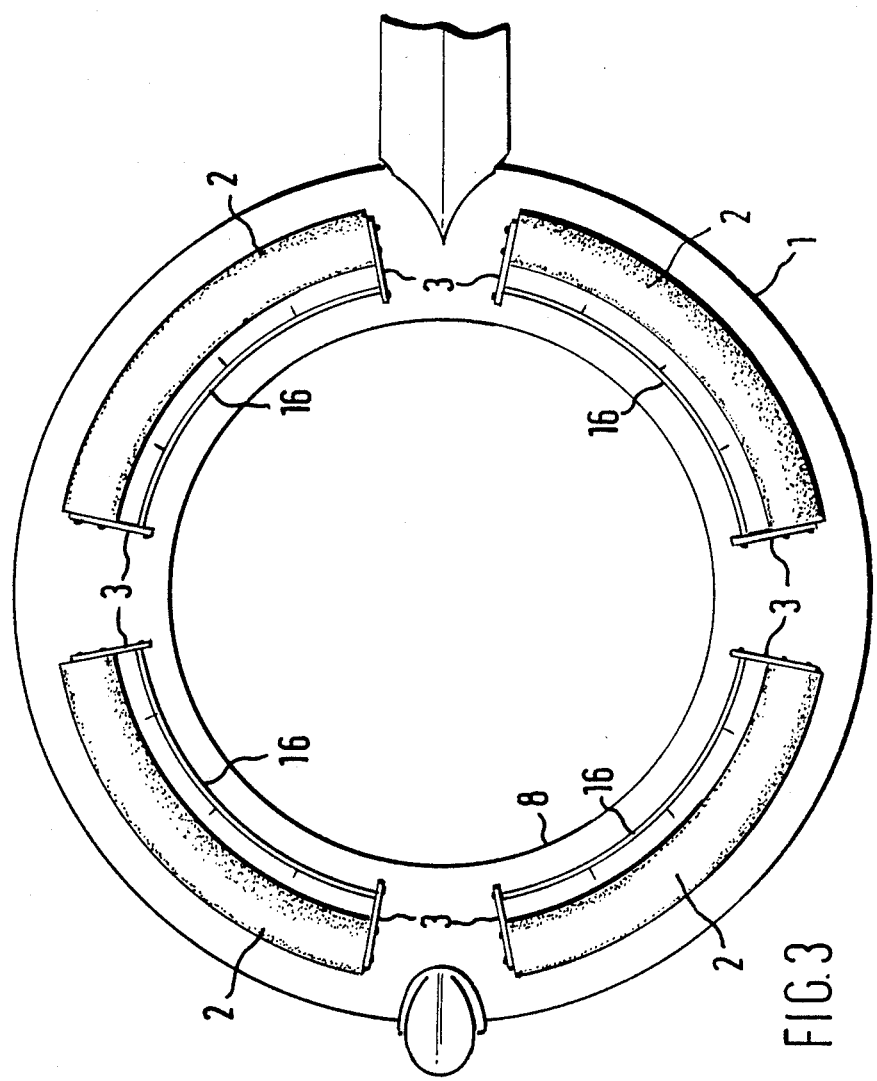
FIG. 3 is a rear view of the engine shown in FIGS. 1 and 2.

The mounting of the vanes 2 on arms 3a and 3b allows the vanes 2 to move between a retracted position shown in the bottom half of FIG. 2 and an extended position shown in FIG. 1 and the upper part of FIG. 2. When in the retracted position, the outer surfaces of the vanes present a smooth profile which offers virtually no drag resistance to air flowing over the engine cowl and the portion of the arms 3a' and 3b' (see FIG. 2) remaining exposed offer only a knife edge to the slip stream and thus generate minimal drag. It will be appreciated that the inner surface of the vanes 2 should be shaped to conform to the underlying surface of the cowl 11 to fit snugly against the cowl when the vanes 2 are in a retracted position. In the extended position, the vanes provide a segmented substantially annular duct 14 between the vanes 2 and the underlying surface of the cowl 11 and between the arms 3 located at the ends of each vane, i.e. at the end of each duct segment.

The spring-biassed hinge pins 12 urge the vanes 2 into their extended position; the vanes can be moved into their retracted position by a cable 4 (see FIG. 2), which has a portion 4a extending around the circumference of the cowl 11, and which is attached along its length to the four vanes 2. The cable is held in position by guide pulleys 15 spaced around the cowl 11 in the regions between the individual vanes 2. A portion 4b of the cable is fed over further pulleys 15' to one or more hydraulic servo motors (not shown) housed in the utilities region of the engine. The servo motors are controlled by electrically operated two-position hydraulic control valves which, in one setting position, feed fluid to the servo motors to pull the part of the cable 4b in the direction of arrow A and thereby also pull the circumferential part 4a of the cable to move the vanes 2 into their retracted position against the action of spring hinges 12. When it is desired to extend the vanes, the control valves are switched to a second setting position in which they vent the hydraulic fluid from the servo motors in which case the motors no longer pull the cable 4 and so the spring hinges 12 urge the vanes 2 into their extended position; the hydraulic fluid is preferably vented through a restrictor valve to release the cable 4 gradually and so cushion the movement of the vanes 4 under the action of the spring hinges 12 and the airstream so that they are not jerked from the retracted to the extended position.

The cowl 11 and/or the arms 3 may be fitted with resilient (rubber) snubbers to stop and adjust the aft translation of the vanes 2 in the extended position.

A remotely-controlled solenoid-operated lock or sear 5 acts on the lower surface of at least one of the arms of each vane 2 to lock it in the retracted position. This sear 5 operates in the same way as a sear in a single-action pistol which holds the firing hammer in a cocked position.

The movement of the vanes 2 between their extended and retracted positions can be activated by a special control in the aircraft cockpit but I prefer that the vanes are moved automatically to their extended positions when the aircraft flaps are deployed and are moved automatically to their retracted position when the flaps are returned to their 'up' position. In other words, the control that deploys the flaps also releases the lock or sear 5 and operates the hydraulic control valves of the servo motors to vent hydraulic fluid from the servo motors to release cable 4; the vanes 2 are thus moved by the spring hinges 12 to their extended position; the control that moves the flaps to their 'up' position also actuates the hydraulic motors to pull the cable 4 and so retract the vanes, the vanes being locked by the sears 5 as soon as they reach their retracted position.

Under each vane 2, there is a slot shaped, rearwardly facing nozzle 16 and high pressure air is fed to these nozzles from a manifold 6 by way of air ducts 17; I prefer to bleed air from the airframe anti-icing supply to provide air for the manifold duct 6 but air can be bled from other high pressure areas within the engine, if preferred. Air from manifold 6 is fed to the nozzles which eject air rearwardly into the duct 14 between the extended vane 2 and the cowl 11. The action of the air being ejected from the nozzles reduces pressure at the inlet to the duct 14 and so causes further air to be drawn into the leading end 18 of the duct 14. The duct 14 is relatively wide at its inlet end 18 and also at its outlet end 19 but there is a flow restriction along its length caused by the outer surface 20 of the slot nozzles 16. This restriction causes venturi-type air flow through the duct 14 which not only produces turbulence in the air passing out through the trailing outlet end 19 of duct 14 (the effect of which is discussed in more detail below) but also it causes a greater volume of air to be drawn into the inlet end 18 of the duct under the action of the air being ejected from the nozzles 16. In other words, the ejection of high pressure air from the nozzles 16 forms an ejector (or jet) pump to draw air into the inlet end 18 of the duct 14 and eject it rearwardly through outlet 19; this pumping action is enhanced by the presence of the venturi restrictions 20 in the duct.

The high-pressure manifold 6 can be closed by a valve 21 when the vanes 2 are moved to their retracted position. Again, the valve 21 is preferably opened when the flaps are deployed and closed when the flaps are returned to their 'up' position.

The operation of the arrangement depicted in the accompanying drawings is as follows:

Prior to take-off, the flaps are deployed and if the vanes 2 are not already in an extended position, the deployment of the flaps releases sears 5 and allows the vanes to move to their extended position; also, valve 21 is opened by the flap control causing air to be fed along manifold 6 to the nozzles 16 which produces a zone 22 (see FIG. 1) of turbulent air around the high velocity exhause plume 23 of the engine; the zone 22 forms a buffer around the plume and so reduces the rubbing action of the air in the plume against the ambient air and hence reduces engine noise. The turbulent zone 22 is not only formed from air ejected through the nozzles 16 but also by air drawn in through the open end 18 of the duct 14 by the action of the air being ejected from nozzles 16, and also, if the aircraft is moving, by the flow of air resulting from the motion of the aircraft through ambient air. The buffer zone 22 reduces the engine noise even on take-off; an additional benefit of the movement of air through the duct 14 is that it provides extra thrust to the engine.

When the flaps are moved to the 'up' position after take-off, the flap control also actuates servo motors to pull cable 4 and thereby move the vanes 2 into their retracted position where they are locked in position by sear 5 and cause only minimal drag during flight; also the flap control closes valve 21 in manifold 6 to shut off air supply to the nozzles 16. As the aircraft approaches its destination, the flaps are lowered for landing and the flap control releases sear 5 and vents the hydraulic control to the servo motors controlling cable 4 so that the spring hinges 12 can move the vanes 2 to the extended position. Simultaneously, valve 21 is open allowing high pressure air to be ejected from nozzles 16.

The arrangement may include proximity switches (now shown) which will indicate to the pilot when the vanes 2 are extended.

I claim:

1. A jet engine having a front and rear end, an exhaust nozzle at the rear of the engine, a cowl forwardly of the exhaust nozzle, a plurality of vanes that extend substantially circumferentially around the cowl of the engine adjacent the exhaust nozzle, means to movably support the vanes on the cowl so that the vanes can be moved between a retracted position close to the cowl and an extended position spaced apart from the cowl so that, together with the cowl, the extended vanes define a substantially annular duct, at least one nozzle beneath each vane for directing air from the engine into the annular duct in a direction towards the rear of the engine for feeding high pressure air from the engine to the at least one nozzle beneath the vanes, and an actuator for moving the vanes between the extended and retracted positions.

2. An engine as claimed in claim 1, wherein each vane is supported by means of a plurality of pivoted supporting arms.

3. An engine as claimed in claim 1, which includes a plurality of springs to bias the vanes to said extended position.

4. An engine, as claimed in claim 1, wherein the actuator for moving the vanes includes at least one cable connected to the vanes to pull the vanes towards the retracted position.

5. An engine, as claimed in claim 4, which includes hydraulic servo attached to the at least one cable for pulling or releasing the cable.

6. An engine as claimed in claim 1, which includes a remotely releasable locking mechanism for locking the vanes in said retracted position.

7. An engine, as claimed in claim 1, wherein, when the vanes are in an extended position, each vane and an underlying section of the engine cowl defines a restriction in the duct in the direction of air flow through the duct.

8. An engine as claimed in claim 7, wherein the nozzles are located in a region of the restriction.

9. An engine as claimed in claim 1, wherein the nozzles beneath the vanes are slot-shaped.

10. An arrangement for reducing the exhaust noise from a jet engine that has a cowl, an exhaust nozzle at the rear of the engine and a source of high pressure air, wherein the arrangement comprising:

means for attaching a plurality of vanes that can extend substantially circumferentially around the cowl of the engine in a region of the exhaust nozzle, means to support the vanes of the attached means so that the vanes can be moved between a retracted position in which the vanes will lie close to the cowl and an extended position in which the vanes will be spaced apart from the cowl so that, together with the cowl, the extended vanes will define a substantially annular duct, actuating means for moving the vanes between the extended and retracted positions, a plurality of nozzles that can be arranged beneath the vanes, and a manifold for feeding air from a high pressure air source of the engine to the nozzles.

11. The arrangement, as claimed in claim 10, wherein each vane is supported by means of a plurality of pivoted supporting arms.

12. The arrangement, as claimed in claim 10, which includes a plurality of springs to bias the vanes to said extended position.

13. The arrangement, as claimed in claim 10, wherein the actuating means includes at least one cable connected to the vanes to pull the vanes towards said retracted position.

14. The arrangement, as claimed in claim 13, including at least one hydraulic servo attached to the cable for pulling or releasing the cable.

15. The arrangement, as claimed in claim 10, including a remotely releasable locking mechanism for locking the vanes in said retracted position.

16. The arrangement, as claimed in claim 10, wherein the nozzles beneath the vanes are slot-shaped.

* * * * *